US009727881B2

(12) United States Patent
Roy et al.

(10) Patent No.: US 9,727,881 B2
(45) Date of Patent: Aug. 8, 2017

(54) FEEDBACK BASED TECHNIQUE TOWARDS TOTAL COMPLETION OF TASK IN CROWDSOURCING

(75) Inventors: Shourya Roy, Bengaluru (IN); Sujit Gujar, Bangalore (IN)

(73) Assignee: XEROX CORPORATION, Norwalk, CT (US)

( * ) Notice: Subject to any disclaimer, the term of this patent is extended or adjusted under 35 U.S.C. 154(b) by 758 days.

(21) Appl. No.: 13/350,965

(22) Filed: Jan. 16, 2012

(65) Prior Publication Data

US 2013/0185138 A1 Jul. 18, 2013

(51) Int. Cl.
*G06Q 10/00* (2012.01)
*G06Q 30/02* (2012.01)

(52) U.S. Cl.
CPC .................... *G06Q 30/02* (2013.01)

(58) Field of Classification Search
CPC ........ G06Q 10/00; G06Q 40/00; G06Q 40/06; G06Q 30/02; G06F 17/60
USPC ...................... 705/7.13, 7.21, 7.14
See application file for complete search history.

(56) References Cited

U.S. PATENT DOCUMENTS

| 2009/0287532 | A1* | 11/2009 | Cohen ................. | G06Q 10/06 705/7.14 |
| 2011/0225290 | A1 | 9/2011 | Kansal et al. | |
| 2013/0006717 | A1* | 1/2013 | Oleson et al. ........... | 705/7.41 |
| 2013/0096968 | A1* | 4/2013 | Van Pelt et al. .......... | 705/7.13 |

OTHER PUBLICATIONS

Eric Huang, et al., "Toward Automatic Task Design: a Progress Report". In the Proceedings of the Second Human Computation Workshop, 2010.
Your estimated waiting time: Infinite! http://behind-the-enemy-lines.blogspot.com/2009/02/your-estimated-completion-time-infi-nite.html.
Lydia B. Chilton, et al. 2010. "Task search in a human computation market". In Proceedings of thhe ACM SIGKDD Workshop on Human Computation (HCOMP '10). ACM, New York, NY, USA 1-9.
The New Demographics of Mechanical Turk—A computer Scientist in a Business School; http://behind-the-enemy-lines.blogspot.com/2010/03/new-demoqraphics-of-mechanical-turk.html.
Grabriella Kazai, "An exploration of the influence that Task Parameters Have on the Performance of Crowds". In the proceedings CrowdConf, 2010.

(Continued)

*Primary Examiner* — Romain Jeanty
(74) *Attorney, Agent, or Firm* — Fay Sharpe LLP

(57) ABSTRACT

The present disclosure provides a method for incenting potential contributors for creating content in response to a posting. The method comprises: posting a task to a first crowdsource with the task having a first expiry period of $\delta_1$; waiting for $\delta_1$ period to expire; determining whether the task is complete; reposting the task if not complete including a second expiry period of $\delta_2$; waiting for the second period of $\delta_2$ to expire; reposting the task if not yet complete including an increased reward and a third expiry period of $\delta_3$; waiting for the third period of $\delta_3$ to expire; and, reposting the task if still not complete, wherein the reposting includes a second crowdsource.

14 Claims, 4 Drawing Sheets

(56) References Cited

OTHER PUBLICATIONS

Shailesh Kochhar, et al. 2010. The anatomy of a large-scale human computation engine. In proceedings of the ACM SIGKDD Workshop on Human Computation (HCOMP '10). ACM, New York, NY, USA, 10-17.
Artificial Intelligence, with Help From the Humans—New York Times; http://ww.nytimes.com/2007/03/25/business/yourmoney/25stream.html.

* cited by examiner

FEEDBACK BASED TECHNIQUE TOWARDS TOTAL COMPLETION OF TASK IN CROWDSOURCING

BACKGROUND

The World Wide Web provides an arena for the exchange of vast amounts of information from an increasingly diverse set of individuals. From a PhD candidate's doctoral dissertation to a microblogger's update on their current wardrobe selection, different types of information can be found on the World Wide Web from people having a range of different backgrounds. Websites like youtube.com, associatedcontent.com, wikipedia.org, myspace.com, etc. allow users to submit content (e.g., text, images, videos) for public consumption, social networking, or for compensation. The number of individuals providing content to these sites and the number of individuals accessing this content show that people or workers are not only willing to provide content for others to view, but are also interested in providing content to be part of a network or in exchange for compensation.

Content distributors or requestors can encourage or hire content contributors or workers to provide content by compensating and/or incenting the content contributors for their content (i.e. crowdsourcing). Crowdsourcing is a very real and important business idea. Definitions and terms vary, but the basic idea is to tap into the collective intelligence (i.e. collective resources) of the public at large to complete business-related tasks that a company would normally either perform itself or outsource to a third-party provider. Yet labor acquisition on a mass scale is only a narrow part of crowdsourcing's appeal. More importantly, it enables managers to expand the size of their talent pool while also gaining deeper insight into what customers really want. Crowdsourcing has emerged over last few years as an important labor pool for a variety of tasks, for example, from digitization, image labeling, user studies, natural language tasks, machine translation evaluation, and EDA simulation, to big innovation contests conducted by companies such as Netflix and Innocentive.

Crowdsourcing is a new mode of organizing work which allows individuals to work and potentially earn money without the need for physical co-location, employment contracts, or even an established identity. Internet based online marketplaces such as, for example, Amazon Mechanical Turk (AMT) allows companies or individuals (requesters) to post jobs for people (workers) to complete them for relatively small amounts of money. Large numbers of people can participate in such crowdsourcing activities in these marketplaces. There were over 100,000 registered workers on AMT in 2007 and the numbers have increased many folds since then, as the demographics have changed significantly. In general most workers spend a day or less per week working on Amazon Mechanical Turk (as one illustrative example), and tend to complete 20-100 tasks per week at their free time to earn small amount of money (typically less than $20 per week). Of course, there are a few workers that devote a significant amount of time and effort, completing thousands of tasks, and generating a respectable income of more than $1000/month.

SUMMARY

In one aspect of the present disclosure, a method is provided for incenting potential contributors for creating content in response to a posting. The method comprises: posting a task to a first crowdsource with the task having a first expiry period of $\delta_1$; waiting for $\delta_1$ period to expire; determining whether the task is complete; reposting the task if not complete including a second expiry period of $\delta_2$; waiting for the second period of $\delta_2$ to expire; reposting the task if not yet complete including an increased reward and a third expiry period of $\delta_3$; waiting for the third period of $\delta_3$ to expire; and, reposting the task if still not complete, wherein the reposting includes a second crowdsource.

In another aspect of the present disclosure, a method is provided for incenting potential contributors for creating content in response to a posting. The method comprises: posting a first batch of work to a crowdsource with the first batch having a first expiry period of $\delta_1$; posting at least a second batch of work to the crowdsource with the at least second batch of work having the first expiry of $\delta_1$, wherein each additional posting of subsequent batches are done in incremental periods of time; monitoring the status of the first batch after the $\delta_1$ period; and reposting unfinished work from the first batch of work having a second expiry period of $\delta_2$ and posting at least another batch of work.

In yet another aspect of the present disclosure, a method is provided for incenting potential contributors for creating content. The method comprises: posting a first batch of work to a crowdsource with the first batch having a first expiry period of $\delta_1$; posting at least a second hatch of work to the crowdsource with the at least second batch of work having the first expiry $\delta_1$, wherein each additional posting of subsequent batches are done in incremental periods of time; monitoring the status of the first batch after the $\delta_1$ period; and reposting unfinished work from the first batch of work having a second expiry period of $\delta_2$ and posting at least another batch of work.

DETAILED DESCRIPTION

Figure 1:
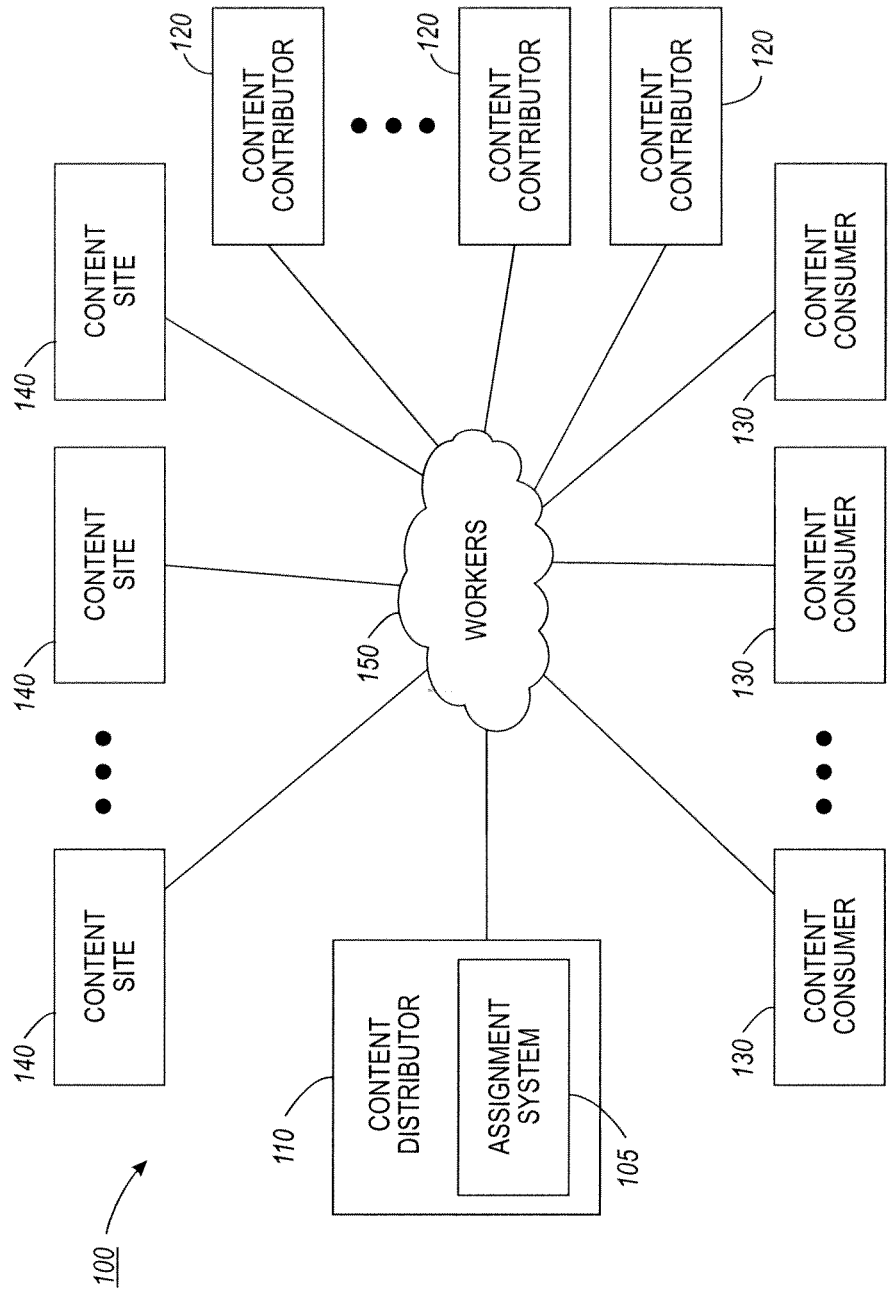
FIG. 1 is a block diagram of a representative environment in which an assignment system can operate.

Though online marketplaces can enable a large amount of tasks to get completed in relatively short span of time, it has been observed that a lot of tasks there remain incomplete. In such marketplaces, users can take up an atomic unit of tasks or an instance of a task. In AMT, such instances are known as HITs (Human Intelligence Tasks). For example, if a requester wants to label 1000 images with appropriate captions and an instance is comprised of 2 images, then there are 500 total instances posted (assuming each image is worked upon by one worker). Requesters can post such large tasks on online marketplaces but typically not all instances are taken up or completed by workers. Once posted, workers take up individual instances to work on them. Workers can sort tasks by which tasks are most recently posted and which have the largest number of instances available. As instances are being taken up, the image labeling task keeps falling down the list of all available tasks because more recent tasks get posted and the number of remaining instances keeps reducing. Consequently, some instances take a lot of time to get completed or in the worst case, never get done. Small scale experiments have shown that completion time of tasks in AMT follows power law distribution and at the tail there are tasks which need a lot of time. In many crowdsourcing experiments, there is no stable average completion time. Crowdsourcing experiments can frequently generate waiting times which are much higher than average waiting times and can have an infinite mean. Studies reporting statistics such as mean and variance of completion time of tasks in crowdsourcing typically assume completion time of unfinished tasks as the time until the job expires.

Past research has also revealed that a task's completion time can be correlated with the amount of work requested per unit of payment, as well as other parameters like time during the day when a task was published, task design, etc. Naturally, participants are more inclined to complete as many tasks as possible within the shortest time, to the detriment of quality of their work, if they benefit more in terms of monetary rewards. Generally, increasing incentive should lead to faster completion of tasks. Also, faster completion of instances does not necessarily ensure completion of entire tasks. Different payment mechanisms can be used to motivate crowd members to complete all the tasks. For example, for data collection tasks, the payment mechanism of an hourly payment strategy can be more efficient than the more common per-task payment strategy for contract workers. This may address the issue of difficult tasks not getting completed as people would be fine to spend more time on such tasks. However, this will lead to issues regarding peoples' throughput, especially for Internet based crowdsourcing platforms.

Based on some crowdsourcing experiments for translation of idioms from Hindi and Chinese to English, it was found that completion time of tasks increases significantly (from less than an hour to a few days) with introduction of automatic validation of crowd input. Without validation, people will typically produce low quality results but will get tasks completed efficiently. With validation quality improves but the process becomes slow with a fraction of tasks not ever getting completed (assuming no explicit expiration of tasks).

Another motivating factor for improving the outcomes of crowdsourcing comes from the more recent trend of enterprise crowdsourcing. Global enterprises are increasingly adopting crowdsourcing given the ease of access to a scalable workforce online. This is emerging as a feasible alternative to expand workforce, to reach out to traditionally unreachable workers such as housewives, retired people, and people staying in rural areas, as well as, a means of reducing the cost for execution of tasks. As an example, crowdsourcing is expected to be one of the important paradigms for service delivery (BPO, document and creative services, etc.) in emerging markets. The scale will be achieved by people who are loosely connected to the enterprise or 'crowdsource' and not by traditional employees. Uncertainty in completion time (and thoroughness) of tasks is a much more serious issue here as business activities are time bound and guided by Service Level Agreements (SLAs) with their clients. It is just not good enough to get a lot done in a short time and at a cheaper rate, but it is mandatory to get everything done within a stipulated time duration at a reasonable rate.

In some embodiments, the assignment system can target and/or incent assignments to content contributors. The system can identify content contributors who are well-suited to generate content that will be successful among a target audience and can notify those contributors of available assignments. The contributors may be identified based on, for example, their expertise in a particular area, their past experience with providing content of a particular type (e.g., an article, audio, an image, a slideshow, a video) or on a specific topic (e.g., photography, boating, shopping, restaurants, taxes, et. al.) or to a target audience (e.g., to women, to youth aged 15-19, to people of German ancestry, etc.), their geographic location (e.g., zip code, city, state, country), or the success (e.g., number of views, viewer ratings) of the contributor's previously provided content, etc.

With the rise of user-generated media such as blogs, Wikipedia, MySpace, and YouTube, it's clear that traditional distinctions between producers and consumers are becoming blurry. It's no longer fanciful to speak of the marketplace as having a "collective intelligence"—today that knowledge, passion, creativity, and insight are accessible for all to see.

The idea of soliciting customer input is hardly new, of course, and the open-source software movement showed that it can be done with large numbers of people. The difference is that today's technology makes it possible to enlist ever-larger numbers of non-technical people to do ever-more complex and creative tasks, at significantly reduced cost.

With a deft touch and a clear set of objectives, quite literally thousands of people can be incented to help a business. From designing ad campaigns, to vetting new product ideas, to solving difficult R&D problems, chances are that people outside company walls can help assist with business tasks. The crowdsource can become one more resource to use to get work done. In return, most participants in the crowdsource simply want some personal recognition, a sense of community, or at most, a financial incentive.

Crowdsourcing can improve productivity and creativity while minimizing labor and research expenses. Using the Internet to solicit feedback from an active and passionate community of customers can reduce the amount of time spent collecting data through formal focus groups or trend research, while also seeding enthusiasm for upcoming products. By involving a cadre of customers in key marketing, branding, and product-development processes, managers can reduce both staffing costs and the risks associated with uncertain marketplace demand.

Crowds are not employees, so executives can't expect to control them. Indeed, while they may not ask for cash or in-kind products, participants will seek compensation in the form of satisfaction, recognition, and freedom. They will also demand time, attention, patience, good listening skills, transparency, and honesty. For traditional top-down organizations, this shift in management culture may prove difficult.

An assignment and incentive system and method for generating content creation requests or "assignments" along with incented completion of assignments to content contributors is disclosed herein. The assignment system can be part of a content distribution system that aggregates, manages, incents, and distributes/syndicates multimedia content that is generated by content contributors. As part of the acquisition of content, the assignment system can compensate and incent the content contributors for the content that they provide to the system. There is significant problem of uncertainty of task completion in crowdsourcing owing to multiple factors and which have serious implications in different scenarios. To be described in more detail hereinafter, a method of tackling the problem associated with crowdsourcing is proposed comprising solutions for more predictable completion times as well as increasing fraction of tasks getting completed by the crowd.

The present disclosure introduces the concept of feedback from crowdsourcing platforms to the module which is responsible for design and distribution of tasks. A new component is introduced which monitors progress of tasks periodically and keeps track of how many tasks have been completed, pending tasks, and desired completion time for pending tasks, etc. Depending on progress of tasks, the feedback component suggests appropriate actions to the task distribution module to avoid tasks staying incomplete for long and moves the tasks towards a more deterministic average task completion time.

The issue around uncertainty of completion time of tasks in a crowdsourcing scenario has heretofore not received much attention and the present disclosure represents an attempt to address this issue in a novel systematic manner. The proposed techniques can use Internet based crowdsourcing platforms but are also applicable to Enterprise Crowdsourcing scenarios of alternate, loosely connected workforce options such as Satellite Centers, Rural BPO, home shoring, and contract based employees.

The proposed techniques provide for a novel feedback mechanism, from crowdsourcing execution platforms to task distribution modules, to increase probability of more tasks getting completed in a crowdsourcing platform.

The proposed techniques still further provide for a mechanism of preempting tasks and reposting, with selectable varying parameters, which can make it more likely that crowd members will take up unfinished jobs and/or re-visit unfinished jobs. The method in the present disclosure also considers trade-offs among various parameters such as hiring people to do the tasks, cost of hiring people vs. cost of crowdsourcing, completion times, throughput in crowdsourcing vs. throughput in executing tasks in house.

FIG. 1 is a block diagram of a representative environment 100 in which an assignment or distribution system 105 may operate. In the depicted example, a content distributor 110 is coupled to content contributors 120, content consumers 130, and content sites 140, via a computer network 150. The computer network 150 may be a public or private computer network 150, such as the Internet, a local area network, a wide area network, a point-to-point connection, a wireless network, and so on. The content distributor 110 collects, stores, and manages the presentation, distribution, and syndication of content. The content distributor 110 provides an interface, such as a website, through which content contributors 120 submit content and through which content consumers 130 access content. Content contributors 120 can comprise authors, artists, film producers, illustrators, etc. who generate and/or provide content that may be hosted by content distributor 110. Content contributors 120 may have any level of experience, from an amateur with little to no content publishing experience or knowledge in any specific area or an expert with thirty years of experience in a particular field. Content consumers 130 represent individuals who are presented the provided content. Content consumers 130 may browse or search for various pieces of content through menus, navigation interfaces, etc. provided by the content distributor 110 or by content sites 140. Content sites 140 represent third-party sites, such as cnn.com or slashdot.org that may be partnered with or otherwise receive content from, the content distributor 110. Each content site 140 may rely on the content distributor 110 for some or all of the content that is presented on the site. For example, a content site may generate its own original content but it may also display content from the content distributor 110.

The assignment system 105 and aspects of the content distributor 110 can be implemented on one or more computing systems. Computing systems can include a central processing unit, memory, input devices (e.g., keyboard and pointing devices), output devices (e.g., display devices), and storage devices (e.g., disk drives). The memory and storage devices can be computer-readable media that may be encoded with computer-executable instructions that implement the assignment system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the assignment system 105 and associated environment may be implemented in and used with various operating environments that include personal computers, server computers, handheld or laptop devices, mobile devices, multiprocessor systems, microprocessor-based systems, network PCs, minicomputers, mainframe computers, computing environments that include any of the above systems or devices, and so on.

The assignment system 105 may be described in the general context of computer-executable instructions, such as program modules, executed by one or more computers or other devices. Generally, program modules include routines, programs, objects, modules, data structures, and so on that perform particular tasks or implement particular abstract data types. Typically, the functionality of the program modules may be combined or distributed as desired in various embodiments.

Figure 2:
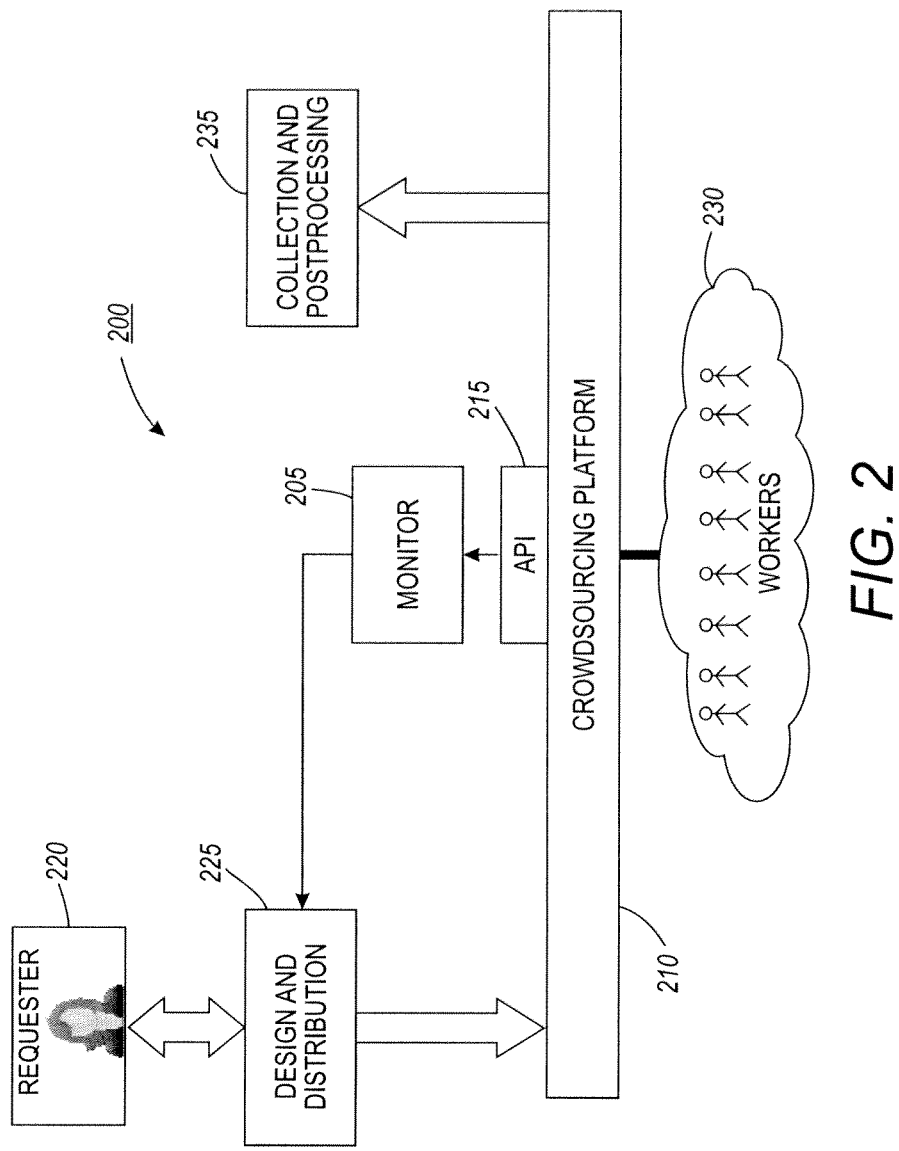
FIG. 2 is a block diagram displaying various modules in a crowdsourcing platform/scenario.

FIG. 2 captures different modules in a crowdsourcing scenario 200 along with the proposed 'monitor' function. "Crowdsourcing platform" 210 refers to platforms which enable crowdsourcing either directly (i.e. AMT) or indirectly through multiple channels (e.g. Crowdflower). These enable requesters 220 to post tasks from web portals as well as expose a set of application programming interfaces (APIs) 215 so that requesters can interact with them programmatically. A 'design and distribution' module 225 or component can be responsible for designing tasks and posting them on the platforms 210. Several design parameters can be considered, such as, the reward per instance, expiry time, qualification requirements for workers 230, the total number of instances, redundancy per task, the number of assignments per instance, etc. A 'collection and post-processing' module 235 or component gathers responses from the platform 210 and performs any post-processing 235 such as cleansing, validation, etc. before passing on to the next stage in the workflow.

The monitor module 205 can be responsible for periodically polling progress of tasks posted and at appropriate time, feeding back information with suggested actions to the "design and distribution" module 225. The following actions can be taken depending on stage and severity. Repost the task (i.e. pre-empt and post the same instance of the task without any change to the parameters). Reposting will make the task appear high up in most recently posted jobs. Increase incentives for the task (i.e. pre-empt and post with higher incentive). Use alternate workforce for the task (i.e. pre-empts and assign to alternate workforce with guaranteed completion time).

One should note that depending on the scenario, more alternatives can be considered. For example, if there are multiple types of crowd sources available who vary in cost, efficiency, accuracy etc. then reposting can be multi-staged including gradually increasing costs or incentives and improving efficiency.

Figure 3:
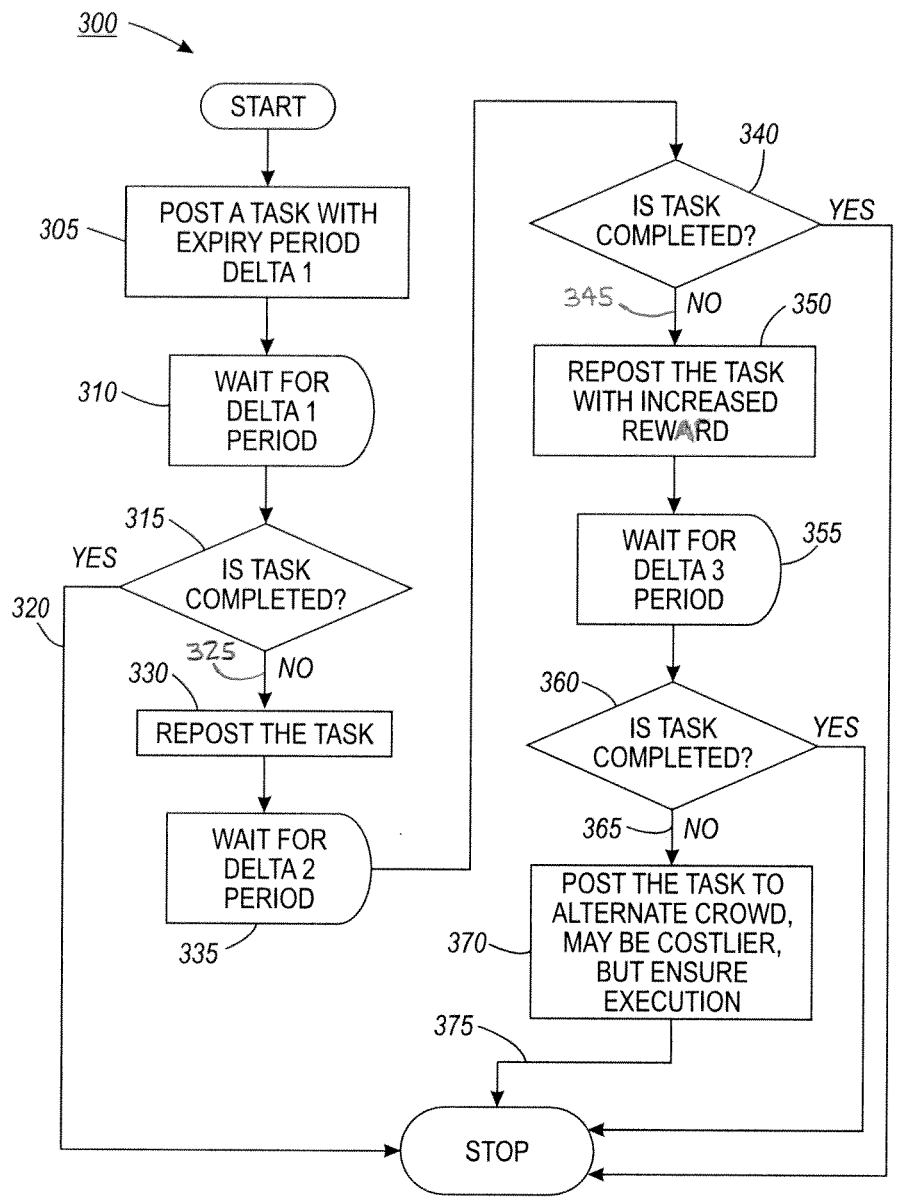
FIG. 3 is a flow diagram illustrating an exemplary environment in which an assignment and monitor system can operate; and, FIG. 4 is an illustrative example of how tasks can be simultaneously posted at periodic intervals while handling residual jobs from previous batches or assignments.

FIG. 3 shows a flowchart 300 of actions outlining some of the above alternatives. As an illustrative example, assume that a task is posted 305 that needs to be completed in 1 unit of time, and the task requires negligible time for a worker to finish it once a 'worker' accepts it to perform. The requester can post the task with expiry time $\delta_1 < 1$ [310], instead of 1 which the requester would have done otherwise with the assumption that all tasks will get completed 315. If the task is completed within $\delta_1$ [320], then stop. If task is not completed 325 or taken up by any worker, then repost the same task 330 with expiry time $\delta_2 < (1-\delta_1)$ [335]. If the task is still remaining incomplete 340 at the end of $(\delta_1+\delta_2)$ [345], then increase the reward by $\mu$ [350], thereby increasing the likelihood of the job being taken up by workers with an expiry period of $\delta_3 < (1-(\delta_1+\delta_2))$ [355]. In the worst case, if the task 360 still does not get completed 365, request alternate workforce 370 to execute it which would ensure guaranteed execution 375.

The parameters of $\delta_i$ and $\mu$ can be determined in a number of ways. One possibility is a heuristic based approach, but the parameters could also be computed based on experiments on held-out validation datasets considering several parameters. Some of the parameters to consider would be the arrival process, the serving process, type of tasks (boring, long tasks), behavior of the workers at various crowdsourcing platforms 210 (doing a few instances and then taking long breaks). The motivation behind using crowdsourcing scenarios 200, 300 is to leverage the various crowd sources 230, 370 to get tasks done cheaper and faster.

One illustrative proposed method or solution, according to the above discussion, is explained below with an example. A requester would like to use crowdsourcing for 100 instances of a task which could be a task of adding captions to 100 images or 100 scanned invoices to be digitized in Microsoft Excel format in Enterprise Crowdsourcing scenario. Assuming the following variables: 100 instances are generated every hour and all of them should be completed within 10 hours of posting. Each instance requires negligible amount of time to complete compared to the total duration (or time to expiry of tasks) which is 10 hours in this case. The method can leverage APIs exposed by Crowdflower to perform different steps as explained in FIGS. 2 and 3. The method or solution can propose that every hour 100 instances are to be posted in batches. Posting in batches is more preferable than posting individual instances because tasks are presented to workers as a ranked list of number of available instances.

Figure 4:
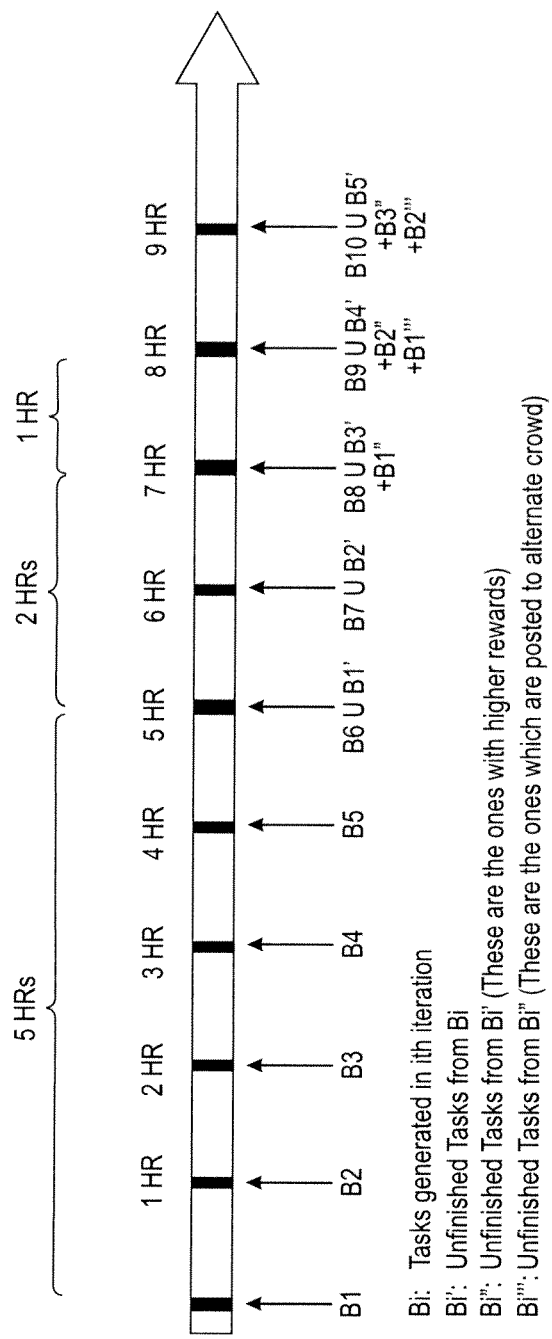

The first batch of tasks (B1) can be posted with an expiry of 5 hours as shown in the FIG. 4. At the same time the monitor 205 can also be instructed to poll the status of tasks in this batch after 5 hours. At the end of every subsequent hour, new batches of 100 instances are posted B2 . . . B5. At the end of the 5$^{th}$ hour, before posting new jobs, the monitor 205 polls the status of jobs posted in B1 and identifies tasks which are incomplete (B1'). These residual jobs (B1') are posted along with B6 and include expiry periods for B1' and B6 being 2 hours and 5 hours respectively. The outcome provides for newly posted tasks which will feature higher up in the list of available jobs and will be more likely to be taken up. If at the end of 7 hours from initial posting, there are still some instances from B1" that are incomplete, they can then be pre-empted (forced-expiry) and reposted with increased reward with an expiry period of 1 hour. This is going to increase the cost of the task but will increase the chance of workers taking it up for higher rewards. Even with increased rewards, the task may not be completed at the end of 8 hours since it was originally posted (5+2+1). The remaining tasks B1''' can then be pre-empted to alternate work force such as enterprise employees, where the tasks B1''' are 'guaranteed' to get completed albeit at a higher cost.

Another exemplary implementation or application is detailed below using a 'Crowdflower platform' which offers a robust set of APIs. The 'CrowdFlower' API can give developers the ability to build applications that interact with and use all the features of 'CrowdFlower' in an automated fashion. Tasks can be generated, work can be ordered, and each application can be notified and updated as data is processed and judged by the 'CrowdFlower' platform. One detailed example, including a listing of relevant APIs and how they can be used for implementing different features, is outlined below.

It is to be appreciated that 'CrowdFlower' can be programmed to use a series of API applications. The applications can accept data as URL-encoded key value pairs. Authentication can be keybased. Responses can be restricted to the JSON format, for example. For uploading a task, i.e. putting a task on 'Crowdflower', the URL based API can be: /jobs/upload. The format can be as follows: curl—T 'sampledata.json'—H 'Content-Type: application/json' (http://api.crowdflower.com/v1/jobs/upload.json?key=$API_KEY). The sampledat.json can contain multiple tasks details. 'CrowdFlower' can also support csv files to be uploaded for bulk posting of tasks. The format can be as follows: curl—T 'sampledata.csv'—H 'Content-Type: text/csv' (http://api.crowdflower.com/v1/jobs/upload.json?key=$API_KEY).

For getting the status of the task, the URL based API can be: /jobs/$JOB_ID/ping; and the format can be as follows: (http://api.crowdflower.com/v1/jobs/$JOB_ID/ping.json?key=$API_KEY).

If one wants to cancel a job before its expiry (i.e. forced expiry), the URL based API can be: /jobs/$JOB_ID/cancel; and the format can be as follows: (http://api.crowdflower.com/v1/jobs/$JOB_ID/cancel?key=$API_KEY).

For changing the incentive of a particular task, the URL based API can be: curl—X PUT—data-urlencode 'job[payment_cents]=1000'—data-urlencode 'key=$API_KEY'; and the format can be as follows: (http://api.crowdflower.com/v1/jobs/$JOB_ID.json).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for incenting potential contributors for creating content, the method comprising:
providing a crowdsourcing application to a requestor for exposing an application programming interface to the requestor;
acquiring a task at a content distributor sent from a requestor computing device over a computer network, the content distributor comprising a processor and a memory that stores a design and distribution module for designing tasks based on design parameters including at least one of a reward per instance, expiry time, worker qualification requirements, a total number of instances, redundancy per task, and a number of assignments per instance and a monitor module for polling a progress of the tasks, wherein the processor;

designs the task based on at least one design parameter for posting to a crowdsource;

in response to a $\delta_1$ period expiring after the task being posted to the crowdsource, generates a status of content submitted by content contributors through an interface in communication with the content distributor;

in response to the status indicating the task being incomplete at the $\delta_1$ period, redesigns the task by changing at least one design parameter;

provides the redesigned task to the requestor computing device over the network with at least a second $\delta_2$ period to expire;

wherein the redesigned task causes the application to display on the requestor computing device and enables the requester to repost the redesigned task to the crowdsource from a web portal.

2. The method of claim 1, wherein the posting and the reposting over are done in batches and said batches represent a portion of said task.

3. The method of claim 1, wherein each $\delta_n$ period for expiration is greater than a $\delta_{n+1}$ subsequent period for expiration.

4. A method for incenting potential contributors for creating content, the method comprising:

providing a crowdsourcing application to a requestor for exposing an application programming interface to the requestor;

acquiring a task and completion time at a content distributor sent from a requestor computing device over a computer network, the content distributor comprising tasks based on design parameters including at least one of a reward per instance, expiry time, worker qualification requirements, a total number of instances, redundancy per task, and a number of assignments per instance and a monitor module for polling a progress of the tasks, wherein the processor;

designs the task based on at least one design parameter for posting to a crowdsource in at least two batches in incremental periods of time;

in response to a $\delta_1$ period expiring after the first batch being posted to the crowdsource, generates a status of content submitted by content contributors through an interface in communication with the content distributor;

in response to the status indicating the first batch being incomplete at the $\delta_1$ period, redesigns the task by changing a period for expiration associated with the first batch;

provides the redesigned task to the requestor computing device over the network with at least a second $\delta_2$ period for the first batch to expire;

wherein the redesigned task causes the application to display on the requestor computing device and enables the requester to repost the first batch and a second batch to the crowdsource from a web portal.

5. The method of claim 4, wherein the processor further monitors the status of the batches after at least two combined periods of expiration; and, redesigns the task for reposting an unfinished portion of at least one batch over the network with an increased reward.

6. The method of claim 5, wherein each $\delta_n$ period for expiration is greater than a $\delta_{n+1}$ subsequent period for expiration.

7. The method of claim 5, wherein the processor further monitors the status of the batches after at least two combined periods of expiration; and, redesigns the task for reposting an unfinished portion of at least one batch over the network to an alternative crowdsource.

8. A method for incenting potential contributors for creating content, the method comprising:

providing a crowdsourcing application to a requestor for exposing an application programming interface to the requestor;

acquiring a task and completion time at a content distributor sent from a requestor computing device over a computer network, the content distributor comprising a processor and a memory that stores a design and distribution module for designing tasks based on design parameters including at least one of a reward per instance, expiry time, worker qualification requirements, a total number of instances, redundancy per task, and a number of assignments per instance and a monitor module for polling a progress of the tasks, wherein the processor;

a) designs the task based on at least one design parameter for posting to a crowdsource;

b) in response to a predetermined period expiring after the task being posted to the crowdsource, generates a status of content submitted by content contributors through an interface in communication with the content distributor;

c) in response to the status indicating the task being incomplete at the predetermined period, redesigns the task by changing an expiration period;

d) provides the redesigned task to the requestor computing device over the network with a new period to expire;

e) repeats steps b)-d) until the task is completed or the completion time is reached;

wherein each redesigned task causes the application to display on the requestor computing device and enables the requester to repost the each redesigned task to the crowdsource from a web portal.

9. The method of claim 8, wherein the processor further redesigns the task after each expiration period in response to the task being incomplete, wherein redesigned task enables a reposting of an incomplete portion of the task to a second crowdsource.

10. The method of claim 9, wherein the posting and the repostings are done in batches and said batches represent a portion of said task.

11. The method of claim 8, wherein the processor further monitors the status of the task after at least two combined periods of expiration; and, redesigns the task for reposting an unfinished portion of the task over the network to an alternative crowdsource.

12. A system for incenting potential contributors for creating content, the system comprising:

a content distributor comprising a memory and a processor in communication with the memory for designing tasks based on design parameters including at least one of a reward per instance, expiry time, worker qualification requirements, a total number of instances, redundancy per task, and a number of assignments per instance and for polling a progress of the tasks, wherein the processor;

provides a crowdsourcing application to a requestor for exposing an application programming interface to the requestor;

acquires a task sent from a requestor computing device over a computer network;

designs the task based on at least one design parameter for posting to a crowdsource;

in response to a $\delta_1$ period expiring after the task being posted to the crowdsource, generates a status of content submitted by content contributors through an interface in communication with the content distributor;

in response to the status indicating the task being incomplete at the $\delta_1$ period, redesigns the task by changing at least one design parameter; and provides the redesigned task to the requestor computing device over the network with at least a second $\delta_2$ period to expire;

wherein the redesigned task causes the application to display on the requestor computing device and enables the requester to repost the redesigned task to the crowdsource from a web portal.

13. The system of claim 12, wherein the posting and the reposting over are done in batches and said batches represent a portion of said task.

14. The system of claim 12, wherein each $\delta_n$ period for expiration is greater than a $\delta_{n+1}$ subsequent period for expiration.

* * * * *